(12) United States Patent
Kruegel (10) Patent No.: US 7,643,636 B2
(45) Date of Patent: Jan. 5, 2010

(54) MANAGING MULTIPLE CRYPTOGRAPHIC PERIODS IN A SINGLE CRYPTOGRAPHIC GROUP

(75) Inventor: Chris A. Kruegel, Plainfield, IL (US)

(73) Assignee: Motorola, Inc., Schaumburg, IL (US)

( * ) Notice: Subject to any disclaimer, the term of this patent is extended or adjusted under 35 U.S.C. 154(b) by 1395 days.

(21) Appl. No.: 10/654,075

(22) Filed: Sep. 3, 2003

(65) Prior Publication Data

US 2005/0047598 A1 Mar. 3, 2005

(51) Int. Cl.
*H04L 9/00* (2006.01)
*H04L 9/08* (2006.01)
*H04L 9/32* (2006.01)
*H04M 3/00* (2006.01)
*H04M 1/00* (2006.01)
*H04W 24/00* (2009.01)
*G06Q 30/00* (2006.01)
*G06Q 20/00* (2006.01)

(52) U.S. Cl. .................. 380/264; 380/43; 380/277; 380/278; 380/279; 713/168; 705/26; 705/70; 455/419; 455/423; 455/551

(58) Field of Classification Search .............. 380/286, 380/264, 277–279; 713/168; 705/26, 70; 455/419, 551, 423
See application file for complete search history.

(56) References Cited

U.S. PATENT DOCUMENTS 5,185,795 A * 2/1993 Bright ..................... 713/181
5,381,479 A * 1/1995 Gardeck et al. ............. 380/273
5,404,403 A * 4/1995 Bright et al. ............... 380/277
5,404,404 A * 4/1995 Novorita ................... 380/271
5,412,722 A 5/1995 Sherly et al.
5,832,086 A * 11/1998 Rosauer .................... 380/273
5,964,829 A * 10/1999 Ozden et al. ............... 718/102
2002/0126849 A1* 9/2002 Howard et al. ............. 380/277

OTHER PUBLICATIONS

EPC Search Report Dated Jan. 17, 2008.
Pham, et al. "Otar Rekeying of a System Scanning of Rapid Roaming Radio", Motorola Technical Developments, Motorola, Inc. Schaumburg, IL, vol. 33, Dec. 1997, pp. 32-33, XP000753414, ISSN: 0887-5286.

* cited by examiner

*Primary Examiner*—Shin-Hon Chen
(74) *Attorney, Agent, or Firm*—Terri S. Hughes; Valerie M. Davis (57) ABSTRACT

A plurality of storage location numbers ("SLNs"), each having a cryptographic period, is received at a first device (100). A system cryptographic period is determined based on the SLN cryptographic periods. Prior to expiration of each system cryptographic period, if at least one SLN requires an updated, the first device sends updated key material for the at least one SLN. A second device (102) maintains first, second, and third keysets, wherein the first and second keysets comprise key material. The second device receives a message to make the first keyset active, and a second message for updating at least a portion of the key material in the second keyset with updated key material for at least one SLN. The second device makes the third keyset equivalent to the second keyset, updates the second keyset with the updated key material, and receives a third message to make the second keyset active.

16 Claims, 6 Drawing Sheets

| SLN | SLN ALIAS | CRYPTO PERIOD (WEEKS) |
|---|---|---|
| SLN1 | POLICE | 4 |
| SLN2 | FIRE | 4 |
| SLN3 | SANITATION | 1 |
| SLN4 | DOG CATCHER | 3 |
| SLN5 | INTEROP KEY | 3 |

| SLN | SLN ALIAS | CRYPTO PERIOD (WEEKS) |
|---|---|---|
| SLN1 | POLICE | 4 |
| SLN2 | FIRE | 4 |
| SLN3 | SANITATION | 1 |
| SLN4 | DOG CATCHER | 3 |
| SLN5 | INTEROP KEY | 3 |

*FIG. 3*

| SYSTEM CRYPTO PERIOD | WEEK(S) | | | | | |
|---|---|---|---|---|---|---|
| SYSTEM CRYPTO PERIOD | WEEK | POLICE | FIRE | SANITATION | DOG CATCHER | INTEROP KEY |
| 1 | 1 | NO CHANGE | NO CHANGE | NEEDS UPDATE | NO CHANGE | NO CHANGE |
| 2 | 2 | NO CHANGE | NO CHANGE | NEEDS UPDATE | NO CHANGE | NO CHANGE |
| 3 | 3 | NO CHANGE | NEEDS UPDATE | NEEDS UPDATE | NEEDS UPDATE | NEEDS UPDATE |
| 4 | 4 | NEEDS UPDATE | NO CHANGE | NEEDS UPDATE | NO CHANGE | NO CHANGE |
| 5 | 5 | NO CHANGE | NO CHANGE | NEEDS UPDATE | NEEDS UPDATE | NEEDS UPDATE |
| 6 | 6 | NO CHANGE | NEEDS UPDATE | NEEDS UPDATE | NO CHANGE | NO CHANGE |
| 7 | 7 | NEEDS UPDATE | NO CHANGE | NEEDS UPDATE | NEEDS UPDATE | NEEDS UPDATE |
| 8 | 8 | NO CHANGE | NO CHANGE | NEEDS UPDATE | NO CHANGE | NO CHANGE |
| 9 | 9 | NO CHANGE | NEEDS UPDATE | NEEDS UPDATE | NEEDS UPDATE | NEEDS UPDATE |
| 10 | 10 | NO CHANGE | NO CHANGE | NEEDS UPDATE | NO CHANGE | NO CHANGE |
| 11 | 11 | NO CHANGE | NO CHANGE | NEEDS UPDATE | NO CHANGE | NO CHANGE |
| 12 | 12 | NEEDS UPDATE | NEEDS UPDATE | NEEDS UPDATE | NEEDS UPDATE | NEEDS UPDATE |

| SLN | KS1 (ACTIVE) | KS2 | KS3 (ADDITIONAL) |
|---|---|---|---|
| SLN1 | KEY A v1 | DON'T CARE | DON'T CARE |
| SLN2 | KEY B v1 | DON'T CARE | DON'T CARE |
| SLN3 | KEY C v1 | DON'T CARE | DON'T CARE |
| SLN4 | KEY D v1 | DON'T CARE | DON'T CARE |
| SLN5 | KEY E v1 | DON'T CARE | DON'T CARE |

*FIG. 4*

| SLN | KS1 (ACTIVE) | KS2 | KS3 (ADDITIONAL) |
|---|---|---|---|
| SLN1 | KEY A v1 | KEY A v1 | DON'T CARE |
| SLN2 | KEY B v1 | KEY B v1 | DON'T CARE |
| SLN3 | KEY C v1 | KEY C v2 | DON'T CARE |
| SLN4 | KEY D v1 | KEY D v1 | DON'T CARE |
| SLN5 | KEY E v1 | KEY E v1 | DON'T CARE |

*FIG. 5* 500

| SLN | KS1 | KS2 (ACTIVE) | KS3 (ADDITIONAL) |
|---|---|---|---|
| SLN1 | DON'T CARE | KEY A v1 | ERASED |
| SLN2 | DON'T CARE | KEY B v1 | ERASED |
| SLN3 | KEY C v1 | KEY C v2 | ERASED |
| SLN4 | DON'T CARE | KEY D v1 | ERASED |
| SLN5 | DON'T CARE | KEY E v1 | ERASED |

*FIG. 6*

| SLN | KS1 | KS2 (ACTIVE) | KS3 (ADDITIONAL) |
|---|---|---|---|
| SLN1 | KEY A v1 | KEY A v1 | DON'T CARE |
| SLN2 | KEY B v1 | KEY B v1 | DON'T CARE |
| SLN3 | KEY C v3 | KEY C v2 | KEY C v1 |
| SLN4 | KEY D v1 | KEY D v1 | DON'T CARE |
| SLN5 | KEY E v1 | KEY E v1 | DON'T CARE |

*FIG. 7* 700

| SLN | KS1 (ACTIVE) | KS2 | KS3 (ADDITIONAL) |
|---|---|---|---|
| SLN1 | KEY A v1 | *DON'T CARE* | *ERASED* |
| SLN2 | KEY B v1 | *DON'T CARE* | *ERASED* |
| SLN3 | KEY C v3 | KEY C v2 | *ERASED* |
| SLN4 | KEY D v1 | *DON'T CARE* | *ERASED* |
| SLN5 | KEY E v1 | *DON'T CARE* | *ERASED* |

*FIG. 8*

| SLN | KS1 (ACTIVE) | KS2 | KS3 (ADDITIONAL) |
|---|---|---|---|
| SLN1 | KEY A v1 | KEY A v1 | *DON'T CARE* |
| SLN2 | KEY B v1 | KEY B v1 | *DON'T CARE* |
| SLN3 | KEY C v3 | KEY C v4 | KEY C v2 |
| SLN4 | KEY D v1 | KEY D v2 | *DON'T CARE* |
| SLN5 | KEY E v1 | KEY E v2 | *DON'T CARE* |

*FIG. 9*

| SLN | KS1 | KS2 (ACTIVE) | KS3 (ADDITIONAL) |
|---|---|---|---|
| SLN1 | *DON'T CARE* | KEY A v1 | *ERASED* |
| SLN2 | *DON'T CARE* | KEY B v1 | *ERASED* |
| SLN3 | KEY C v3 | KEY C v4 | *ERASED* |
| SLN4 | KEY D v1 | KEY D v2 | *ERASED* |
| SLN5 | KEY E v1 | KEY E v2 | *ERASED* |

*FIG. 10*

| SLN | KS1 | KS2 (ACTIVE) | KS3 (ADDITIONAL) |
|---|---|---|---|
| SLN1 | KEY A v2 | KEY A v1 | *DON'T CARE* |
| SLN2 | KEY B v2 | KEY B v1 | *DON'T CARE* |
| SLN3 | KEY C v5 | KEY C v4 | KEY C v3 |
| SLN4 | KEY D v2 | KEY D v2 | KEY D v1 |
| SLN5 | KEY E v2 | KEY E v2 | KEY E v1 |

*FIG. 11*

| SLN | KS1 (ACTIVE) | KS2 | KS3 (ADDITIONAL) |
|---|---|---|---|
| SLN1 | KEY A v2 | KEY A v1 | ERASED |
| SLN2 | KEY B v2 | KEY B v1 | ERASED |
| SLN3 | KEY C v5 | KEY C v4 | ERASED |
| SLN4 | KEY D v2 | KEY D v1 | ERASED |
| SLN5 | KEY E v2 | KEY E v1 | ERASED |

*FIG. 12*

| SLN | KS1 (ACTIVE) | KS2 | KS3 (ADDITIONAL) |
|---|---|---|---|
| SLN1 | KEY A v2 | KEY A v2 | KEY A v1 |
| SLN2 | KEY B v2 | KEY B v2 | KEY B v1 |
| SLN3 | KEY C v5 | KEY C v6 | KEY C v4 |
| SLN4 | KEY D v2 | KEY D v2 | KEY D v1 |
| SLN5 | KEY E v2 | KEY E v2 | KEY E v1 |

*FIG. 13*     1300

| SLN | KS1 | KS2 (ACTIVE) | KS3 (ADDITIONAL) |
|---|---|---|---|
| SLN1 | KEY A v1 | KEY A v2 | ERASED |
| SLN2 | KEY B v1 | KEY B v2 | ERASED |
| SLN3 | KEY C v5 | KEY C v6 | ERASED |
| SLN4 | KEY D v1 | KEY D v2 | ERASED |
| SLN5 | KEY E v1 | KEY E v2 | ERASED |

| SLN | KS1 | KS2 (ACTIVE) | KS3 (ADDITIONAL) |
|---|---|---|---|
| SLN1 | KEY A v2 | KEY A v2 | KEY A v1 |
| SLN2 | KEY B v2 | KEY B v2 | KEY B v1 |
| SLN3 | KEY C v7 | KEY C v6 | KEY C v5 |
| SLN4 | KEY D v3 | KEY D v2 | KEY D v1 |
| SLN5 | KEY E v3 | KEY E v2 | KEY E v1 |

| SLN | KS1 (ACTIVE) | KS2 | KS3 (ADDITIONAL) |
|---|---|---|---|
| SLN1 | KEY A v2 | KEY A v1 | ERASED |
| SLN2 | KEY B v2 | KEY B v1 | ERASED |
| SLN3 | KEY C v7 | KEY C v6 | ERASED |
| SLN4 | KEY D v3 | KEY D v2 | ERASED |
| SLN5 | KEY E v3 | KEY E v2 | ERASED |

*FIG. 16*

MANAGING MULTIPLE CRYPTOGRAPHIC PERIODS IN A SINGLE CRYPTOGRAPHIC GROUP

FIELD OF THE INVENTION

The present invention relates generally to managing multiple cryptographic periods in a single cryptographic group.

BACKGROUND OF THE INVENTION

If a user wants to have key material in a secure device to have different cryptographic periods, managing the cryptographic periods can be a challenge. A cryptographic period is defined as the period of time during which key material is valid; key material is used to encrypt and/or decrypt information.

Based on the user's security policy, the user determines how long he wants to use the key material before changing it. Depending on the operations the user is involved with, he may want to have the key material he is using change at different intervals. Changing key material at different interval requires the user to manage multiple cryptographic periods. For example, a user may have key material that needs to change once a month and other key material that needs to change once every six months.

The APCO over-the-air-rekeying ("OTAR") standard defines the ability to use multiple cryptographic groups (a collection of keysets, where a keyset in a group of key material that is valid for the same cryptographic period) to manage multiple cryptographic periods. Multiple cryptographic periods could be obtained by placing key material of the same cryptographic period into the same cryptographic group, wherein the key material is managed using storage location numbers ("SLN"; also known as common key references). The standard allows sixteen different cryptographic groups to be defined, and thus a maximum of sixteen different cryptographic periods could be managed. This solution requires more than two keysets, as keysets must be unique between cryptographic groups.

In existing conventional OTAR two-way radio systems, one cryptographic group and two keysets are used and supported by the APCO OTAR protocol standard. Thus, only one cryptographic period is supported.

Implementing multiple cryptographic groups allows for multiple cryptographic periods; however, managing multiple cryptographic groups and keysets can be confusing and complex. Managing one cryptographic group and two keysets has proven to be a challenge in existing conventional OTAR two-way radio systems. Multiple cryptographic groups also introduce the potential for interoperability issues such as coordinating the SLNs that are used for interoperability and the cryptographic period of those SLNs. Adding a new SLN to an existing system may not be straightforward either. For example, if the user wants to add a SLN, they may not be able to add the next one in their list of SLNs; first the user needs to determine the cryptographic period for the SLN, find the cryptographic group that has this cryptographic period or create a new one, and get a SLN from that cryptographic group.

Thus, there exists a need for a solution that simplifies key management and allows the user to assign a cryptographic period to each SLN in a single cryptographic group without being limited by or coordinating with the existing SLNs in the system.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention allows a user to maintain different cryptographic periods for different storage location numbers ("SLN"; also known as common key references) within the same cryptographic group. The user determines the cryptographic period information per SLN (hereinafter referred to as SLN cryptographic periods) instead of one cryptographic period for the entire cryptographic group. The key material for each SLN is updated as dictated by its independently assigned cryptographic period. For ease of explanation, the present invention makes available two keysets to the user (interchangeably being an active keyset and an inactive keyset); it should be noted that there is only one active keyset per cryptographic group at any given time, however, there may be a plurality of inactive keysets. It is also important to note that the following discussion labels a keyset as active or inactive as perceived by the key management facility ("KMF") 100; in other words, the KMF 100 dictates which keyset is active and inactive. In accordance with the present invention, an additional keyset (one more than what is available to the user) is used to maintain communications within all SLN cryptographic periods. Thus, the present invention minimizes, if not avoids, any loss in communications for all SLN cryptographic periods.

Figure 1:
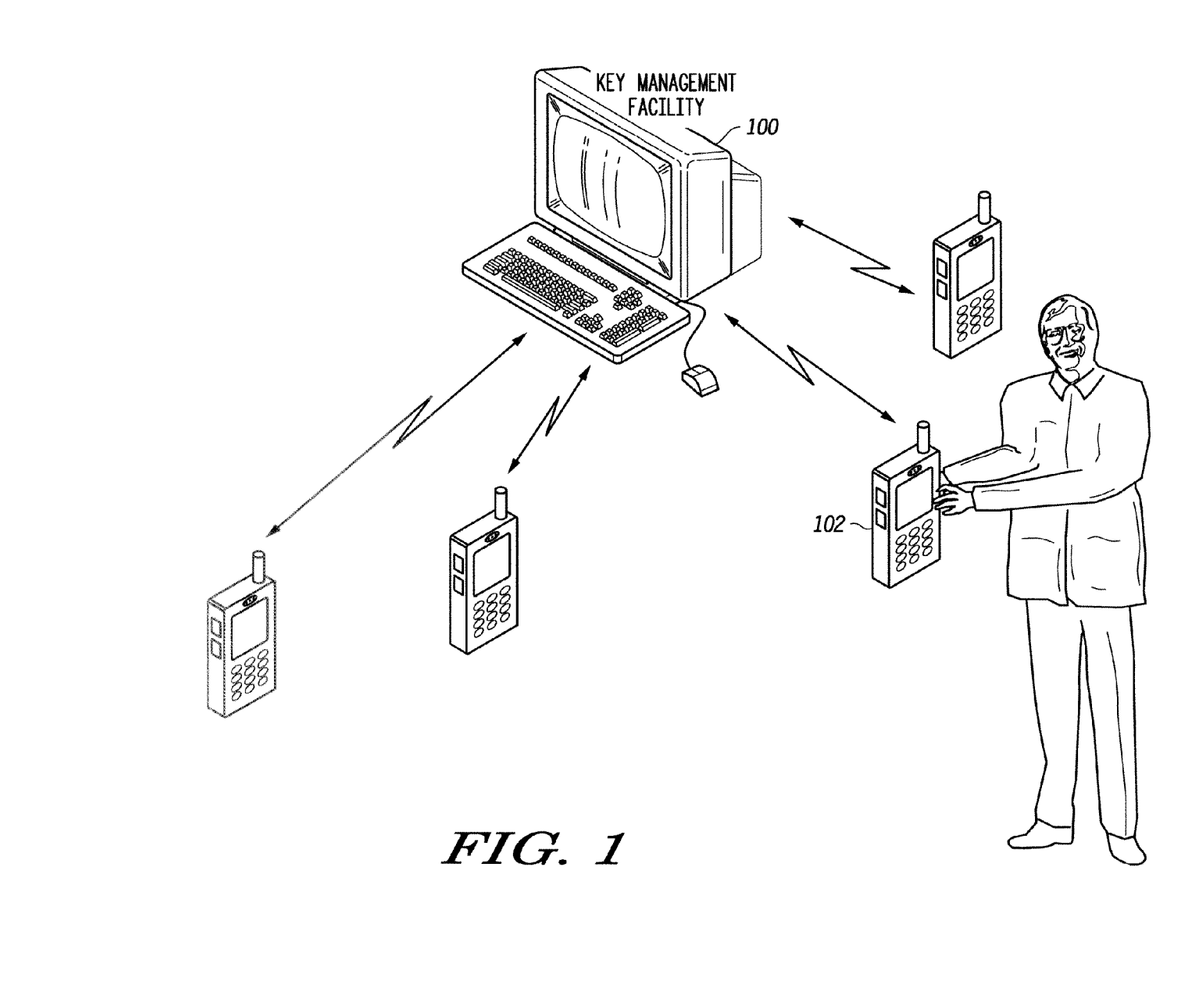
FIG. 1 illustrates a system topology in accordance with the present invention.
Figure 2:
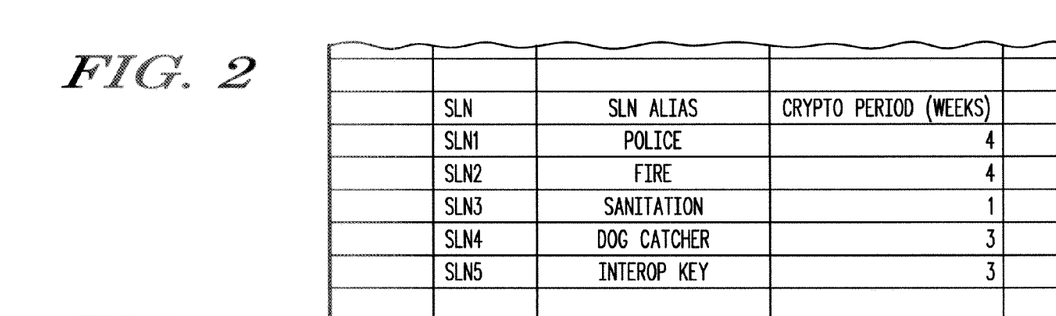
FIG. 2 illustrates a sample of a user's desired cryptographic period for each SLN in accordance with the present invention.

Let us first describe the present invention from the perspective of the KMF 100. The SLN cryptographic period for each SLN is entered into the KMF 100 when the SLN is entered. It should be noted that the unit of time for each SLN cryptographic period must either be entered as the same value or identified when entered for each SLN. Once all the SLNs and their corresponding SLN cryptographic periods are entered, the SLN cryptographic periods need to be converted to the same unit of time (e.g., days, weeks, months, etc.) if not entered as such. FIG. 2 illustrates a sample of a user's desired cryptographic period for each of a plurality of SLNs, in accordance with the invention.

Figure 3:
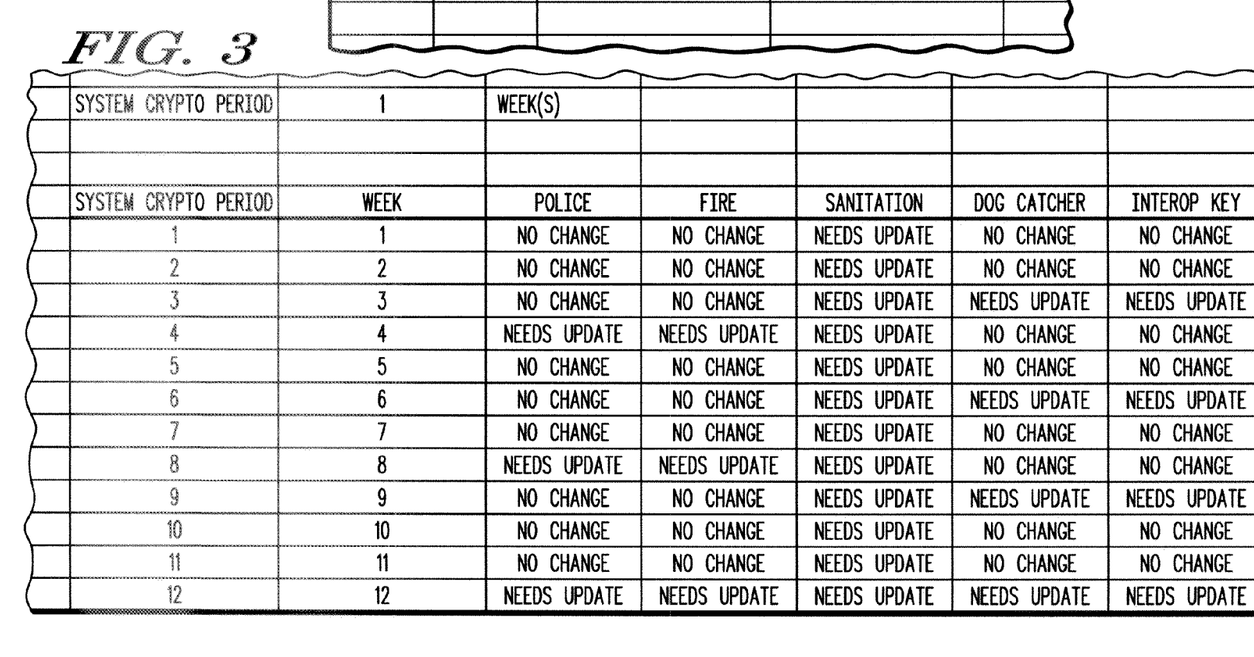
FIG. 3 illustrates the system cryptographic period and how it is used to determine when each SLN defined in FIG. 2 needs to be updated relative to the system cryptographic period to obtain the desired cryptographic period of each SLN in accordance with the present invention.

After the same unit of time has been established, the greatest common divisor (i.e., the largest integer value that divides into all the SLN cryptographic periods evenly) of the SLN cryptographic periods is identified as the system cryptographic period. In FIG. 2 and FIG. 3, the system cryptographic period is 1 week, wherein FIG. 3 illustrates the system cryptographic period and how it is used to determine when each SLN defined in FIG. 2 needs to be updated relative to the system cryptographic period, in accordance with the invention. The KMF 100 also creates SLN cryptographic period groupings that are a collection of SLNs with the same cryptographic period (in this example, the groupings are 1 week, 3 weeks, and 4 weeks).

Once the system cryptographic period is established, the KMF 100 starts at time "zero" and uses a real time clock or other such mechanism to determine when the system cryptographic period length of time has been reached (1 week in this example). When the system cryptographic period length of time has been reached, the KMF 100 knows to begin the next system cryptographic period, and so on. The KMF 100 keeps track of how many system cryptographic periods have expired. Prior to expiration of the system cryptographic period length of time, the KMF 100 checks the SLN cryptographic period for each SLN cryptographic period grouping to determine if the key material for a SLN needs to be updated in the current system cryptographic period. The KMF 100 makes this determination based upon the individual SLN cryptographic period length in relation to the current system cryptographic period; there are numerous algorithms which can be implemented by the KMF 100 to perform these functions which will become obvious to those individuals ordinarily skilled in the art of mathematics in view of the present invention, and thus, will not be described in further detail.

After going through all the SLN cryptographic period groupings, if the KMF 100 determines that key material for at least one SLN needs to be updated, the KMF 100 updates the key material for each SLN requiring an update as dictated by its individual SLN cryptographic period in relation to the current system cryptographic period. The KMF 100 further sends out a rekey message to the inactive keyset in the target units 102 with the updated key material for the SLNs requiring an update. Following the procedures for rekeying all involved target units 102, the KMF 100 follows with the appropriate changeover procedure such that an acceptable percentage of target units 102 (as determined by the KMF user (not shown)) are on the newly active keyset upon expiration of the current system cryptographic period as typically known to those individuals ordinarily skilled in the art.

The KMF 100 repeats this process for each system cryptographic period as illustrated in FIG. 3. It should be noted that this process is scaleable to any number of SLN cryptographic periods within the same cryptographic group, up to one for each SLN in the cryptographic group.

As described above, the KMF 100 manages the system cryptographic period and the SLN cryptographic periods and updates the key material for the SLNs, as needed, based on their individual SLN cryptographic periods without user intervention in the preferred embodiment. Alternatively, the KMF user can manually manage the system cryptographic period and the SLN cryptographic periods, and update the key material for the SLNs, as needed. The KMF user determines the cryptographic period of each SLN, determines the system cryptographic period from the individual SLN cryptographic periods, and generates a table (e.g., as illustrated in FIG. 3), or the like, indicating the frequency in which the key material for each SLN needs to be updated in relation to the system cryptographic period. The KMF user manages the system cryptographic period, and prior to the expiration of each period, triggers the KMF 100 to update the key material for each SLN requiring an update as indicated in the table, to send a rekey message to the target units 102, as needed, and to initiate the changeover process.

Let us now describe the present invention from the perspective of the target units 102. The target unit 102 maintains the keysets available to the user (two keysets in the present example) and one additional keyset for each cryptographic group. In the preferred embodiment, the target unit 102 is able to use key material from the active keyset, inactive keyset, and additional keyset for decrypting information; the user however, is only able to use key material from the active and inactive keysets. In an alternative embodiment, the target unit 102 may be configured to make the additional keyset available to the user, thus allowing the user to encrypt information using key material from either the active keyset, inactive keyset or the additional keyset. It is important to note that the target unit 102 uses the additional keyset in order to maintain communication with target units 102 that are not yet up-to-date.

In the present invention, the inactive keyset is always rekeyed with any updated key material. Thus, when the target unit 102 receives a rekey message, it makes the key material that is currently in the additional keyset, if any, equivalent to the key material currently in the inactive keyset (the keyset that is about to be rekeyed). After the additional keyset is equivalent to the inactive keyset, the target unit 102 makes the key material in the inactive keyset equivalent to the key material in the active keyset. There are numerous ways in which the target unit 102 can make these keysets equivalents, such as with the use of pointers, physically copying the key material from one keyset to another, and/or the like.

After the inactive keyset is equivalent to the active keyset, the target unit 102 completes the processing of the rekey message by replacing key material in the inactive keyset for the SLN(s) identified in the rekey message with the updated key material received in the rekey message.

Next, the changeover process begins by making the inactive keyset active upon a trigger from the KMF 100 (as stated above, there is always only one active keyset per cryptographic group); the trigger can be implemented by using a date/time mechanism in the rekey message or via a command from the KMF 100 or other such mechanism (e.g., a manual changeover initiated by the user). Before the changeover process completes, the target unit 102 determines the SLNs for which the key material has not changed between the active keyset and the inactive keyset. If the key material has not changed for a given SLN, the target unit 102 replaces the key material in the inactive keyset with the key material from the additional keyset for the given SLN. This replacement results in the inactive keyset containing the previous version of the key material for each SLN, including those that have not changed in the current system cryptographic period. In the preferred embodiment, the changeover process is completed when the target unit 102 erases the key material in the additional keyset; however, erasing the key material in the additional keyset is optional. Thus, the present invention satisfies all cryptographic periods in the target unit 102 while using only one cryptographic group and maintaining consistent communication characteristics for all SLNs; in other words, making the additional keyset equivalent to the inactive keyset prior to rekeying the inactive keyset allows for the SLNs that are not changing in the current system cryptographic period to continue to use the previous and current versions of the key material for that SLN, thus maintaining consistent communication characteristics for all SLNs. The present invention also allows for those SLNs that are changing on this system cryptographic period to continue to use the previous and current versions of the SLN until the future version of the SLN key material becomes active.

Figure 4:
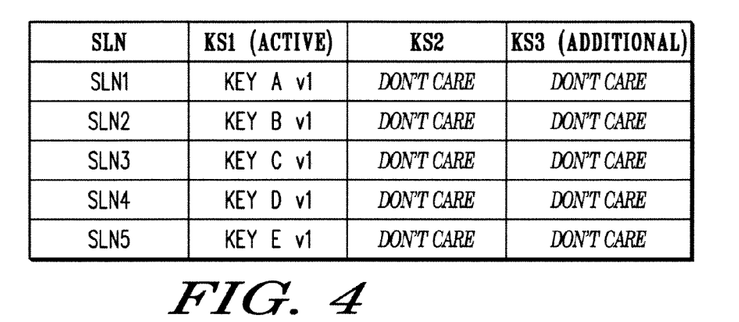
FIG. 4 illustrates an initial state of the key material for each SLN, where the key material initially starts with version 1, in accordance with an illustrative example of the present invention.

Let us now refer to an example of the present invention; this example will only step through six system cryptographic periods for exemplary purposes only. For the table of SLNs and corresponding cryptographic periods illustrated in FIG. 3, FIG. 4 illustrates a table comprising the initial mapping of SLNs and key versions in the target units 102. As noted above, the system cryptographic period has been determined to be one week for the three different SLN cryptographic periods (1 week, 3 weeks, and 4 weeks). All target units 102 are assumed to be current and active on keyset 1.

Figure 5:
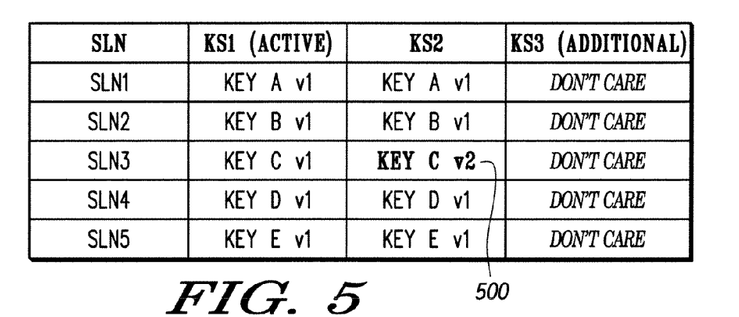
FIG. 5 illustrates the state of the key material within a target unit after the first rekey during the first system cryptographic period in accordance with the illustrative example of the present invention.

FIG. 3 shows the progression of the system cryptographic period and what SLNs need to be updated within each system cryptographic period to maintain the independent SLN cryptographic periods. For the first system cryptographic period, the KMF 100 determines that SLN 3 is the only SLN to be updated this period. As a result, the KMF 100 sends a rekey message to all involved target units 102 to place the updated key material 500 for SLN3 in the inactive keyset (KS2). Upon receipt, the target units 102 process the rekey message as described above such that the key mapping in the target units 102 is as illustrated in FIG. 5, with the updated key material shown in bold typeface.

Figure 6:
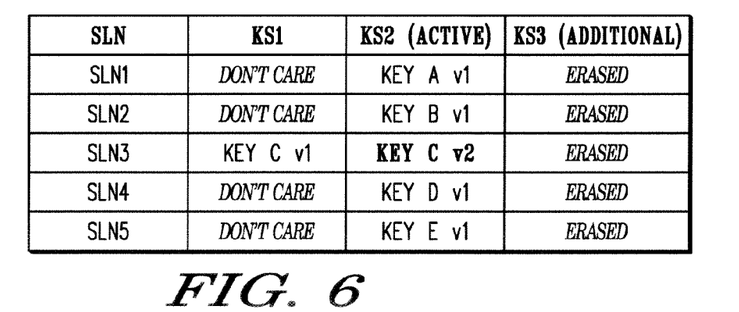
FIG. 6 illustrates the state of the key material within the target unit after the completion of the first system cryptographic period in accordance with the illustrative example of the present invention.

When it is determined that an acceptable number of target units 102 have been updated with the new key material, the changeover process begins as described above. When the changeover process is completed, the key mapping in the target units 102 is as illustrated in FIG. 6.

Figure 7:
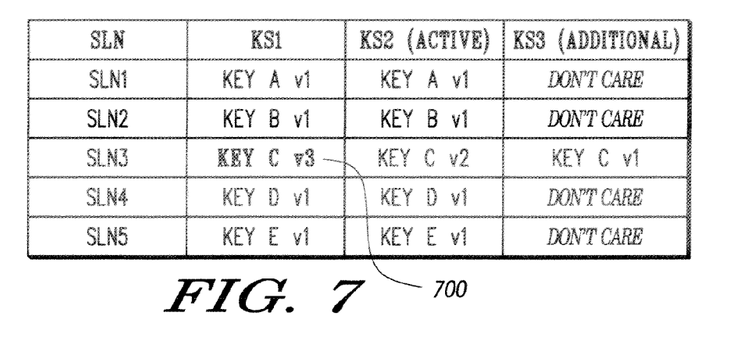
FIG. 7 illustrates the state of the key material within the target unit after the rekey during the second system cryptographic period in accordance with the illustrative example of the present invention.

At this point, the process of updating SLNs for the second system cryptographic period begins. Again, the only SLN that needs to be updated in the second system cryptographic period is SLN3. As a result, the KMF 100 sends a rekey message to all involved target units 102 to place the updated key material 700 for SLN3 into the inactive keyset (KS1). Upon receipt, the target units 102 process the rekey message such that the key mapping is as illustrated in FIG. 7. It should be noted that the target units 102 have copied the key material from the inactive keyset (KS1) into the additional keyset (KS3) while processing the rekey message. Copying the key material from inactive keyset (KS1) to the additional keyset (KS3) allows communications to be maintained with target units 102 that have not been properly updated yet. If this copy had not been made, target units 102 using SLN3 would not have been able to communicate with target units 102 also using this SLN but that were not on the same active keyset.

Figure 8:
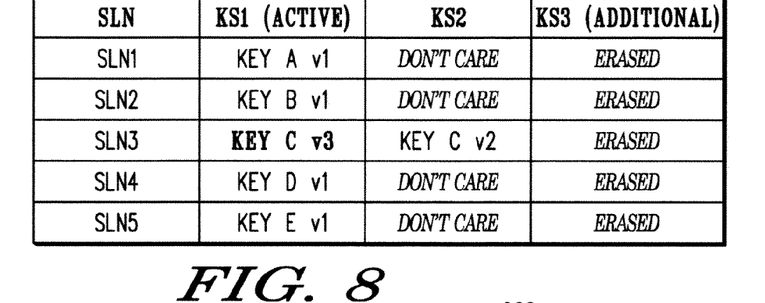
FIG. 8 illustrates the state of the key material within the target unit after the completion of the second system cryptographic period in accordance with the illustrative example of the present invention.

When it is determined that an acceptable number of target units 102 have been updated with the new key material, the changeover process begins. When the changeover process is completed, the key mapping in the target units 102 is as illustrated in FIG. 8. In the preferred embodiment, the additional keyset (KS3) is erased; however, erasing the additional keyset (KS3) is optional.

Figure 9:
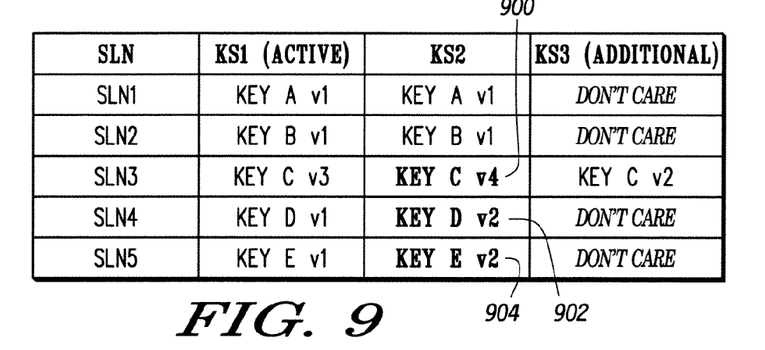
FIG. 9 illustrates the state of the key material within the target unit after the rekey during the third system cryptographic period in accordance with the illustrative example of the present invention.

At this point, the process of updating SLNs for the third system cryptographic period begins. The SLNs that need to be updated in the third cryptographic period are SLN3, SLN4, and SLN5. As a result, the KMF 100 sends a rekey message to all involved target units 102 to place the updated key material 900, 902, 904 for these SLNs into the inactive keyset (KS2). Upon receipt, the target units 102 process the rekey message such that the key mapping in the target units 102 is as illustrated in FIG. 9.

Figure 10:
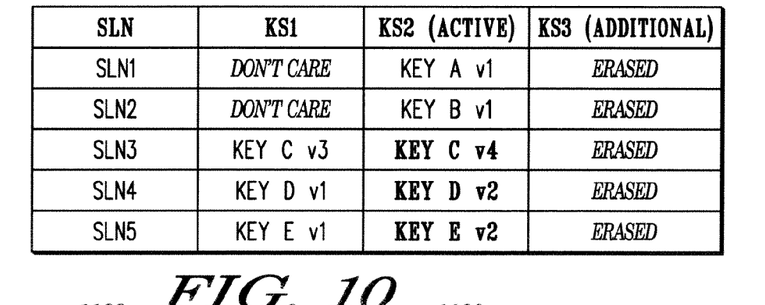
FIG. 10 illustrates the state of the key material within the target unit after the completion of the third system cryptographic period in accordance with the illustrative example of the present invention.

When it is determined that an acceptable number of target units 102 have been updated with the new key material, the changeover process begins. When the changeover process is completed, the key mapping in the target units 102 is as illustrated in FIG. 10.

Figure 11:
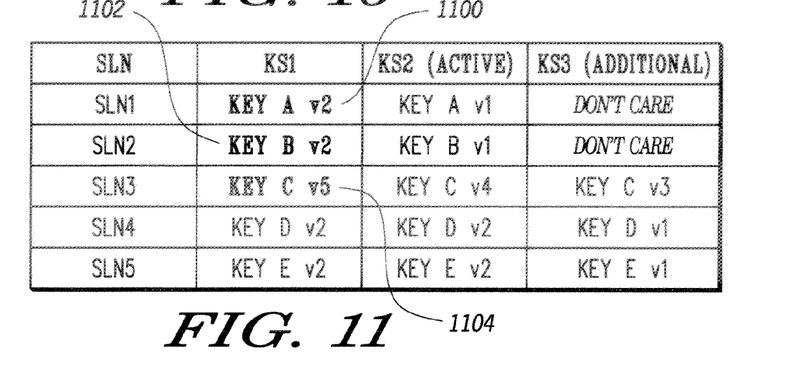
FIG. 11 illustrates the state of the key material within the target unit after the rekey during the fourth system cryptographic period in accordance with the illustrative example of the present invention.

At this point, the process of updating SLNs for the fourth system cryptographic period begins. The SLNs that need to be updated in the fourth system cryptographic period are SLN1, SLN2, and SLN3. As a result, the KMF 100 sends a rekey to all involved target units 102 to place the updated key material 1100, 1102, 1104 for these SLNs in the inactive keyset (KS1). Upon receipt, the target units 102 process the rekey message such that the key mapping in the target units 102 is as illustrated in FIG. 11.

Figure 12:
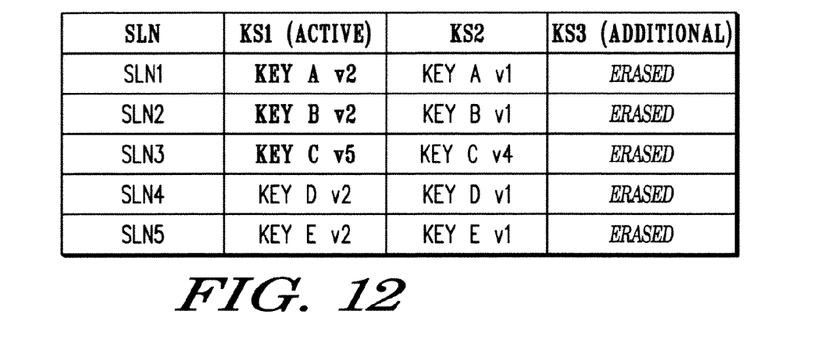
FIG. 12 illustrates the state of the key material within the target unit after the completion of the fourth system cryptographic period in accordance with the illustrative example of the present invention.

When it is determined that an acceptable number of target units 102 have been updated with the new key material, the changeover process begins. When the changeover process is completed, the key mapping in the target units 102 is as illustrated in FIG. 12. It should be noted that even those SLNs that did not change in this system cryptographic period (SLN4 and SLN5) have the correct previous and current versions of the key material.

Figure 13:
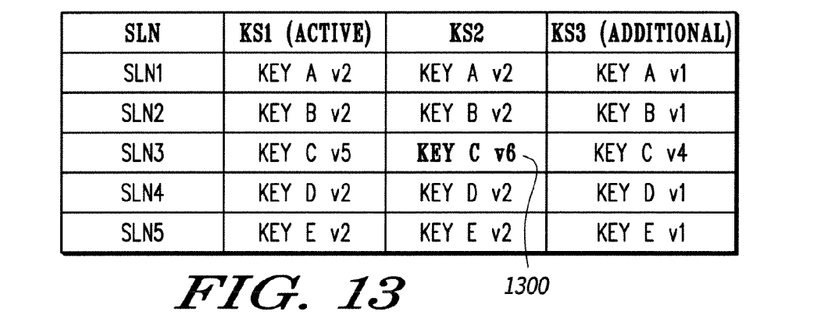
FIG. 13 illustrates the state of the key material within the target unit after the rekey during the fifth system cryptographic period in accordance with the illustrative example of the present invention.

At this point, the process of updating SLNs for the fifth system cryptographic period begins. The SLN that needs to be updated in the fifth cryptographic period is SLN3. As a result, the KMF 100 sends a rekey message to all involved target units 102 to place the updated key material 1300 for SLN3 into the inactive keyset (KS2). Upon receipt, the target units 102 process the rekey message such that the key mapping in the target units 102 is as illustrated in FIG. 13.

Figure 14:
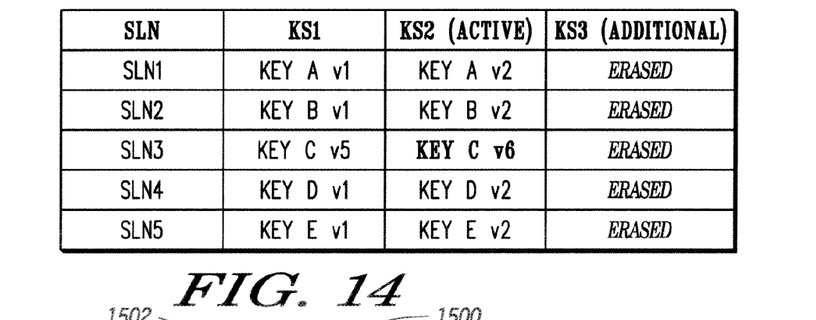
FIG. 14 illustrates the state of the key material within the target unit after the completion of the fifth system cryptographic period in accordance with the illustrative example of the present invention.

When it is determined that an acceptable number of target units 102 have been updated with the new key material, the changeover process begins. When the changeover process is completed, the key mapping in the target units 102 is as illustrated in FIG. 14. Again, the additional keyset (KS3) has been erased in the preferred embodiment of the present invention. It should be noted that if the making equivalent of key material between the inactive keyset and the additional keyset were not completed, non-current target units with SLN1, SLN2, SLN 4, or SLN 5 would not be able to communicate with current targets units 102 even though these SLNs are not being updated at this time. By placing a copy of the key material from the inactive keyset into the additional keyset, the target units 102 are still able to communicate using the previous version of the key material for a given SLN, if so configured. It should also be noted that for those SLN cryptographic periods that did not change in this system cryptographic period, the correct versions of the key material are in the active and inactive keysets. Further, the copy of the key material to the additional keyset from the inactive keyset for SLN3 maintains the previous key material version for SLN3 until the changeover completes, thus maintaining communication with target units 102 that are not on the same system cryptographic period (i.e., target units that are not yet up-to-date) for a longer period of time.

Figure 15:
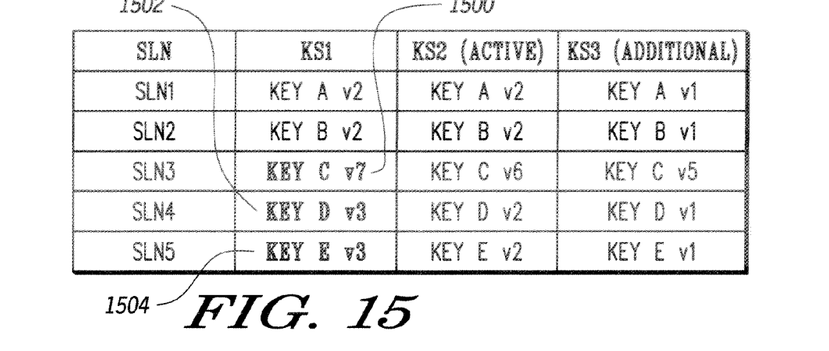
FIG. 15 illustrates the state of the key material within the target unit after the rekey during the sixth system cryptographic period in accordance with the illustrative example of the present invention.

At this point, the process of updating SLNs for the sixth system cryptographic period begins. The SLNs that need to be updated in the sixth cryptographic period are SLN3, SLN4, and SLN5. As a result, the KMF 100 sends a rekey message to all involved target units 102 to place the updated key material 1500, 1502, 1504 for these SLNs in the inactive keyset (KS1). Upon receipt, the target units 102 process the rekey message such that the key mapping in the target units 102 is as illustrated in FIG. 15.

Figure 16:
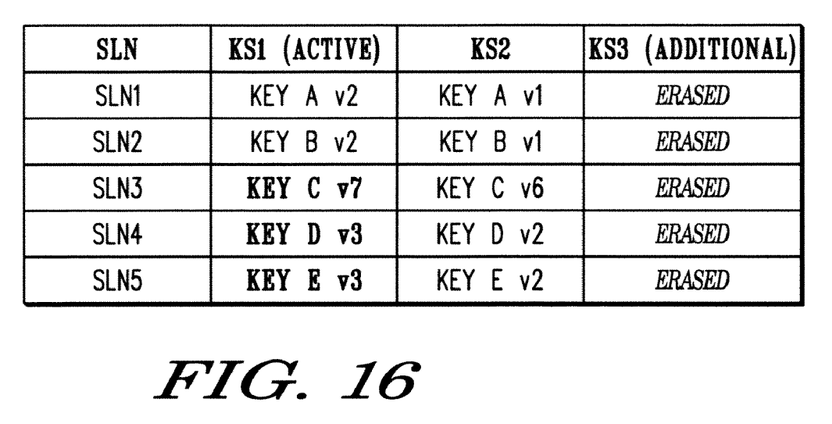
FIG. 16 illustrates the state of the key material within the target unit after the completion of the sixth system cryptographic period in accordance with the illustrative example of the present invention.

When it is determined that an acceptable number of target units 102 have been updated with the new key material, the changeover process begins. When the changeover process is completed, the key mapping in the target units 102 is as illustrated in FIG. 16. Again, it should be noted that the additional keyset has been erased in the target units 102 in accordance with the preferred embodiment of the present invention.

While the invention has been described in conjunction with a specific embodiment, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. For example, as opposed to the KMF 100 sending only the updated key material for the SLN that is being rekeyed in a rekey message during a particular system cryptographic period, the KMF 100 sends the entire set of key material for the inactive keyset, including the updated key material. As such, the step of making the inactive keyset equivalent to the active keyset upon receipt of the rekey message as described above is no longer necessary because, in essence, the KMF 100 is performing this step for the target units 102. Yet another alternative is that the KMF 100 sends the key material for both the active and inactive keysets, including the updated key material, in the rekey message.

Yet another alternative is making a different comparison in the target unit 102 to create the new active and inactive keysets. If only the updated key material for the SLN changing in a particular system cryptographic period is updated in the inactive keyset (and leaving all other key material unchanged in the inactive keyset), the target unit 102 first makes the additional keyset equivalent to the inactive keyset and then updates the inactive keyset with the new key material. When the changeover process begins, if the key material for a given SLN in the inactive keyset is different than the key material for the same SLN in the additional keyset, no change is made to the active or inactive keysets. If, however, the key material for a given SLN in the inactive keyset is the same as the key material for the same SLN in the additional keyset, the target unit 102 replaces the key material for the same SLN in the inactive set with the key material for the same SLN from the active keyset, and the target unit 102 replaces the key material the same SLN in the active set with the key material for the same SLN from the additional keyset. After all the comparisons and replacements, as needed, have been made for each SLN, the target unit 102 makes the inactive keyset active after being triggered by the KMF 100.

Yet still another alternative of the present invention is how the KMF 100 determines when the key material in a SLN needs to be updated. In lieu of using a table to determine when key material in a given SLN needs to be updated as described above in the preferred embodiment, for each SLN cryptographic period grouping (or for each SLN individually), the KMF 100 maintains the SLN cryptographic period length, and the record of time since the last update for that grouping. The record of time starts with one unit of time. For the given system cryptographic period, the KMF 100 compares each SLN cryptographic period with the record of time since the last update. If the values are the same, the SLN is updated with updated key material and the record of time is reset to one. If the values are different, the SLN is not updated at this time and the record of time is incremented by one. This would continue for each system cryptographic period.

Yet still another alternative of the present invention is for the KMF 100 to perform the comparisons and replacements of the key materials as opposed to the target units 102 as described above. For target units 102 that support at least three keysets (one active and two inactive) in a cryptographic group, the KMF 100 sends a rekey message comprising key material to make the second inactive keyset equivalent to the first inactive keyset. The KMF 100 also sends the updated key material for the entire first inactive keyset (which is equivalent to the key material in the active keyset along with the updated key material). Once the changeover process begins, the first inactive keyset becomes active and the KMF 100 performs the comparison of key material between keysets as described above in the preferred embodiment in order to populate the keyset that was active before the changeover. Optionally, the KMF 100 signals the target unit 102 to erase the key material from the second inactive keyset. Alternatively, the KMF 100 could send a rekey message containing the updated key material (which is equivalent to the key material in the active keyset along with the updated key material) to the second inactive keyset, leaving the first inactive keyset alone. In the changeover process, the KMF 100 makes the second inactive keyset the active keyset. The KMF 100 makes the comparisons and updates as described earlier in this paragraph, however using the second inactive keyset instead of the first inactive keyset in the comparison, thus saving the KMF 100 from having to copy KS2 to KS3 and reducing the amount of OTAR messaging.

Thus, it should be understood that the present invention is not limited by the foregoing description, but embraces all such alterations, modifications and variations in accordance with the spirit and scope of the appended claims.

I claim:

1. A method for managing multiple different cryptographic periods in a single cryptographic group comprising the steps of:
   receiving a plurality of storage location numbers ("SLNs") relating to a cryptographic group, wherein each SLN has a SLN cryptographic period and wherein at least two of the SLNs related to the cryptographic group have a different cryptographic period;
   determining a system cryptographic period based on the plurality of SLN cryptographic periods;
   prior to expiration of each system cryptographic period, determining whether any of the plurality of SLNs need to be updated based on its respective SLN cryptographic period; and
   if at least one of the plurality of SLNs needs to be updated, sending a first message comprising updated key material for the at least one SLN.

2. The method of claim 1 wherein the system cryptographic period is the greatest common divisor of the plurality of SLN cryptographic periods.

3. The method of claim 1 wherein the second step of determining and the step of sending are repeated for each system cryptographic period.

4. The method of claim 1 further comprising the step of sending a command to activate the updated key material.

5. The method of claim 1 wherein the first message further comprises at least one of a date and a time to active the updated key material.

6. The method of claim 1 wherein the first message further comprises a first set of key material that is to become active, and a second set of key material that was previously active, and wherein the updated key material for the at least one SLN is contained within the first set of key material.

7. A method for managing multiple different cryptographic periods in a single cryptographic group comprising the steps of:
   maintaining at least a first keyset, a second keyset, and a third keyset, wherein at least the first keyset and the second keyset comprise key material associated with at least one storage location number ("SLN");
   receiving a first message to make the first keyset active and the second keyset inactive;
   receiving a second message for updating at least a portion of the key material in the second keyset with updated key material for at least one SLN;
   making the third keyset equivalent to the second keyset, and thereafter updating the second keyset with the updated key material for the at least one SLN; and
   receiving a third message to make the second keyset active, and the first keyset inactive.

8. The method of claim 7 further comprising the step of, prior to the step of updating, making the second keyset equivalent to the first keyset.

9. The method of claim 8 further comprising the steps of:
   comparing the key material in the first keyset with the key material in the second keyset for each SLN; and
   if the key material in the first keyset is identical to the key material in the second keyset for a given SLN, replacing the key material in the first keyset with the key material in the third keyset for the given SLN.

10. The method of claim 9 further comprising the step of erasing the key material from the third keyset.

11. The method of claim 8 further comprising the steps of:
    receiving a second rekey message for updating at least a portion of the key material in the first keyset with updated material for at least one SLN;
    making the third keyset equivalent to the first keyset;
    making the first keyset equivalent to the second keyset;
    updating the first keyset with the updated key material for the at least one SLN; and
    receiving a fourth message to make the first keyset active, and the second keyset inactive.

12. The method of claim 8 further comprising the step of encrypting a message using key material from one of the first keyset, the second keyset, and the third keyset.

13. The method of claim 8 further comprising the step of decrypting a message using key material from one of the first keyset, the second keyset, and the third keyset.

14. The method of claim 8 wherein, prior to the step of receiving the third message, the first keyset comprises a set of currently active key material for the plurality of SLNs, the second keyset comprises a set of key material that is to become active for the plurality of SLNs, and the third keyset comprises a set of previously active key material for the plurality of SLNs.

15. The method of claim 8 further comprising the step of processing the third message, and after the step of processing, the first keyset comprises a set of previously active key material for the plurality of SLNs, and the second keyset comprises a set of currently active key material for the plurality of SLNs.

16. The method of claim 7 further comprising the steps of:
    comparing the key material in the second keyset with the key material in the third keyset; if the key material in the second keyset is identical to the key material in the third keyset for a given SLN, replacing the key material in the second keyset with the key material in the first keyset for the given SLN, and replacing the key material in the first keyset with the key material from the third keyset for the given SLN.

* * * * *